US009146855B2

(12) United States Patent
Lambert et al.

(10) Patent No.: US 9,146,855 B2
(45) Date of Patent: Sep. 29, 2015

(54) SYSTEMS AND METHODS FOR TRACKING AND MANAGING NON-VOLATILE MEMORY WEAR

(75) Inventors: Timothy M. Lambert, Austin, TX (US); Johan Rahardjo, Austin, TX (US)

(73) Assignee: Dell Products LP, Round Rock, TX (US)

(*) Notice: Subject to any disclaimer, the term of this patent is extended or adjusted under 35 U.S.C. 154(b) by 133 days.

(21) Appl. No.: 13/346,091

(22) Filed: Jan. 9, 2012

(65) Prior Publication Data
US 2013/0179624 A1 Jul. 11, 2013

(51) Int. Cl.
*G06F 12/02* (2006.01)

(52) U.S. Cl.
CPC .... *G06F 12/0246* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 5,708,850 A | * | 1/1998 | Staros | 710/48 |
| 7,305,668 B2 | * | 12/2007 | Kennedy et al. | 717/168 |
| 7,512,847 B2 | | 3/2009 | Bychkov et al. | |
| 7,548,982 B2 | * | 6/2009 | Gu et al. | 709/228 |
| 7,565,563 B2 | * | 7/2009 | Gappisch et al. | 713/401 |
| 7,596,656 B2 | | 9/2009 | Elhamias | |
| 7,716,332 B1 | * | 5/2010 | Topfl et al. | 709/226 |
| 8,200,992 B2 | * | 6/2012 | Felch et al. | 713/300 |
| 8,244,959 B2 | * | 8/2012 | Fusella et al. | 711/103 |
| 8,341,501 B2 | * | 12/2012 | Franceschini et al. | 714/774 |
| 8,495,338 B2 | * | 7/2013 | Jeddeloh | 711/206 |
| 8,504,411 B1 | * | 8/2013 | Subasic et al. | 705/7.33 |
| 8,676,741 B2 | * | 3/2014 | Ulinski et al. | 706/52 |
| 2004/0128618 A1 | * | 7/2004 | Datta | 715/513 |
| 2006/0059320 A1 | * | 3/2006 | Akizuki | 711/158 |
| 2006/0190532 A1 | | 8/2006 | Chadalavada | |
| 2006/0212143 A1 | | 9/2006 | Nguyen et al. | |
| 2006/0265656 A1 | | 11/2006 | Lambert et al. | |
| 2008/0082725 A1 | | 4/2008 | Elhamias | |
| 2008/0288863 A1 | * | 11/2008 | Bohannon | 715/255 |
| 2009/0300265 A1 | | 12/2009 | Vyssotski et al. | |
| 2010/0030948 A1 | | 2/2010 | Moon et al. | |
| 2010/0122200 A1 | | 5/2010 | Merry, Jr. et al. | |
| 2011/0010503 A1 | * | 1/2011 | Yamamura et al. | 711/128 |
| 2011/0047421 A1 | | 2/2011 | Schuette | |
| 2011/0106906 A1 | * | 5/2011 | Assouad | 709/212 |

(Continued)

OTHER PUBLICATIONS

Sauber, "Information Handling System Universal Memory Wear Leveling System and Method", U.S. Appl. No. 12/839,042, filed Jul. 19, 2010, 16 pgs.

(Continued)

*Primary Examiner* — Tuan Thai
*Assistant Examiner* — Mohamed Gebril
(74) *Attorney, Agent, or Firm* — Egan, Peterman & Enders LLP.

(57) ABSTRACT

Systems and methods are disclosed that may be implemented to manage operation and tracking memory wear of flash devices, such as relatively large mixed use embedded NAND flash devices or other non-volatile memory (NVM) devices employed in information handling systems such as servers. The disclosed systems and methods may advantageously be implemented to perform tasks such as tracking and/or predicting actual wear for NVM devices, and optionally controlling write operations to a NVM device. The disclosed systems and methods may also be optionally implemented to generate wear alerts based on tracked or predicted wear of such NVM devices.

32 Claims, 5 Drawing Sheets

(56) References Cited

U.S. PATENT DOCUMENTS

| | | |
|---|---|---|
| 2011/0107016 A1 | 5/2011 | Kim et al. |
| 2011/0145486 A1* | 6/2011 | Owa et al. .............. 711/103 |
| 2012/0047317 A1* | 2/2012 | Yoon et al. ............. 711/103 |
| 2012/0066439 A1* | 3/2012 | Fillingim ................ 711/103 |
| 2013/0067136 A1* | 3/2013 | Bates et al. ............. 711/103 |
| 2013/0086302 A1* | 4/2013 | Tressler et al. ......... 711/103 |
| 2013/0304979 A1* | 11/2013 | Zimmer et al. ......... 711/103 |

OTHER PUBLICATIONS

Lambert et al., "Systems and Methods for Local and Remote Recording, Monitoring, Control and/or Analysis of Sounds Generated in Information Handling System Environments", U.S. Appl. No. 13/097,906, filed Apr. 29, 2011, 32 pgs.

* cited by examiner

SYSTEMS AND METHODS FOR TRACKING AND MANAGING NON-VOLATILE MEMORY WEAR

FIELD OF THE INVENTION

This invention relates generally to information handling systems and, more particularly, to tracking and management of non-volatile memory wear.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Servers are a type of information handling system, and sometimes include managed NAND flash drive devices that are directly embedded in the server motherboard. In one exemplary embodiment, such an embedded device may be further characterized as being permanent and non-removable from the motherboard, e.g., by virtue of solder or other permanent mechanical or electrical connection to the motherboard. Such a NAND flash drive device is provided to contain functions that support features within the server that are provided by the service processor firmware for example. The NAND flash drive device also provides many features related to deployment, lifecycle management, decommissioning, diagnostics, image management, etc.

The endurance of NAND flash memory is an issue, and is particularly critical when used in enterprise system applications which require higher reliability than in consumer products. NAND flash memory is organized as blocks, and each block contains multiple pages. A block can be erased reliably for a limited number of times, and frequent block erase operations reduce the lifetime of the flash memory. Wear leveling has been used to prevent the early wear out of blocks in the flash memory by spreading data around throughout the flash memory.

Managed NAND flash devices, such as embedded multimedia card (eMMC) flash, include integrated controllers that perform functions including wear leveling, error correcting code (ECC), and bad block management to help maintain an expected level of reliability. However, ever shrinking die size and increasing use of multi-level cell technology are factors that continue to reduce the expected endurance of these parts, resulting in a substantial reduction in writes per cell that may be achieved across the typical server product life under typical operating conditions. At the same time, the typical bytes per block are increasing many times, which equates to more cells being accessed on each program and erase. Also, a wide variety of file systems are used which have significantly different write amplification factors.

Existing solutions also include solid state drives (SSD) aware operating systems that implement static settings. For example Microsoft Windows 7 automatically sets Defrag off as a default to reduce writes, and implements a "Trim" feature such that the SSD is aware of files marked as deleted files. Predictive failure determination is also currently an area of interest for improving server availability, and SSDs may have other existing predictive failure methods in place.

FIG. 1 is a simplified block diagram of a conventional NAND flash architecture that includes a NAND flash device 100 coupled to a processing device (baseboard management controller BMC or service processor) 110 by a NAND bus 112 (e.g., eMMC, ONFI, or other type of NAND bus). FIG. 1 shows storage area of NAND flash device 100 as it may be configured with private storage area 102 (e.g., for storing MAC addresses of the server management network controllers, logs of various system events, etc.). Also present in NAND flash device 100 is bootloader N 104 that performs the function of BMC hardware configuration, power on self test and booting of the embedded operating system. An embedded operating system OS (N) 106 is present for the purpose of running all BMC server management functionality. Customer data store 108 is also provided for purposes of system configuration options, such as network settings.

SUMMARY OF THE INVENTION

Disclosed herein are systems and methods for managing operation and tracking memory wear of non-volatile memory devices, including and non-volatile memory device that has a wear limitation/s (e.g., such as NAND or NOR flash memory devices) which acts to limit the number of possible writes and erase operations that may be made to the memory device without memory device failure or performance degradation. Specific examples of such non-volatile memory devices include, but are not limited to, relatively large mixed use embedded NAND flash devices or other flash memory devices employed in information handling systems such as servers. The disclosed systems and methods may advantageously be implemented to perform tasks such as tracking and/or predicting actual wear for such non-volatile memory devices, and optionally controlling write operations to a non-volatile memory device. The disclosed systems and methods may also be optionally implemented to generate wear alerts based on tracked or predicted wear of such non-volatile memory devices. As such, the disclosed systems and methods may be employed in one embodiment to supplement and enhance predictive failure determination for non-volatile memory devices through wear tracking, prediction and/or alerting features, and to optionally control non-volatile memory device wear based on tracked and/or predicted wear. Advantageously, the disclosed systems and methods may be implemented in one embodiment to prevent non-volatile memory memory wear out disasters in the field and to provide visibility for remote and/or local users to understand the impacts of their operations on non-volatile memory memory wear. In one embodiment, these tracking, predicting, alerting, and/or write-control tasks may be advantageously implemented separately from (and outside of) the embedded non-volatile memory memory device itself, in a manner that allows applications to be monitored separately and outside the memory device, e.g., at the service processor OS level, to adjust OS behavior.

In one exemplary embodiment, an Enterprise server provider may be enabled to use the disclosed systems and methods to understand the expected customer and various firmware features and customer usages of non-volatile memory such as embedded Flash device memory. Using this capability, a full expected usage model for many or all uses may be constructed, policed and monitored through development phases as initial and future features are implemented via methods such as explicit profiling and build verification tests. Such a capability may be implemented to achieve real time non-volatile memory device memory usage tracking and write control in the field, e.g., to prevent wear damage situations such as those that may occur when debug code or other code accidentally and excessively writes to a non-volatile memory device that is implemented in a field deployed information handling system, such as a server. Such an excessive wear situation, if not detected and stopped, may prevent customers or field user from being able to update the firmware in the field within a very short time of field deployment. Other example situations where excessive wear may be advantageously detected using the disclosed systems and methods include, but are not limited to, excessive embedded non-volatile memory device wear caused through malicious intent (e.g., caused by a virus) or through accidental misuse (e.g., such as server management scripting mistakes).

In one embodiment, the disclosed system and methods may implement dynamic real-time Program/Erase cycle monitoring and alerting with optional policy recommendation/s. Additionally, the disclosed systems and methods may be employed in another embodiment to implement a wear enforcement methodology that allows the use of customer free use partitions that utilize non-replaceable non-volatile memory media on an information handling system (e.g., without the use of a separate replaceable flash memory device such as SD card) with reduced risk that free use by a customer or other end user may abuse the non-volatile memory component and require replacement. One example of such an implementation is in conjunction with a virtual flash (vFLASH) configuration available from Dell Products L.P. of Round Rock, Tex.

In one exemplary embodiment, embedded OS level granular non-volatile memory device wear tracking and display may be enabled. In this regard, detailed usage statistics are not available within standard embedded non-volatile memory devices with controller such as eMMC embedded storage package that includes controller. However, using the disclosed systems and methods, embedded non-volatile memory device controller device driver statistical gathering software (e.g., executing on an embedded service management processor) may be utilized, for example, to track total device accesses differentiated by read, write and erase accesses (e.g., including tracking and differentiating all of the read, write and erase accesses), with optional timestamps. Furthermore, the disclosed systems and methods may be implemented to provide local and/or remote server users an extractable statistics and graphical representation of non-volatile memory device wear. Examples of extractable statistics and graphical representation include, but are not limited to, total actual part non-volatile memory device wear through the life of a non-volatile memory device, per embedded application granular wear, etc. This capability for tracking wear for each embedded application may be implemented in one embodiment by utilizing embedded non-volatile memory registers with an embedded service before and after accessing the non-volatile memory device. Such an embedded service may gather the before and after counters from a non-volatile memory device driver and log each non-volatile memory device access with a time stamp and identity of the appropriate application responsible for the logged access.

In another exemplary embodiment, the disclosed systems and methods may be implemented to alert a local and/or remote user when out-of-bounds (e.g., greater than expected) total or per-application non-volatile memory device memory device wear activities occur before the theoretical wear out points are reached for the non-volatile memory memory device. In this regard, total and application-specific non-volatile memory wear event alerting with configurable thresholds and end of life prediction, together with an optional breakout of per-application wear contribution. For example, total non-volatile memory device wear may be detected and compared to one or more defined total wear thresholds (e.g., such as 80% or 100% of the acceptable total non-volatile memory device wear), and/or compared to expected wear levels at a given elapsed cumulative system operating time to detect excessive memory use that results in far higher wear than the expected wear level for the given cumulative system operating time. In another exemplary embodiment, actual (historical to-date) wear level use rates may be extrapolated out (e.g., by curve fitting or matching actual data and extrapolating same) to estimate the date (or cumulative system operating time) that the expected 100% wear limit for the given non-volatile memory memory device will be reached at the current wear level use rate. Additionally or alternatively, gross excursions or deviations from expected wear usage at any given cumulative system operating time may be detected and utilized to trigger a customer non-volatile memory operation usage warning when the actual wear use level exceeds the expected wear use level for the given cumulative system operating time. User alerts may be provided using any suitable type of alerting methods including, but not limited to, System Event Log (SEL) alert, LCD, LED, email, SNMP alert, etc. Alerts may include any type of information related to current total and/or per-application use including, but not limited to, the current embedded wear percentage use level, pareto graph of wear contributing applications (e.g., visual graph that orders all applications between the highest to lowest wear contributors versus some other order such as alphabetical), etc.

In another exemplary embodiment, per-application sub-thresholds may be created (e.g., defined or later by a user) and used as levels for triggering user alerts when the sub-thresholds are exceeded by actual tracked wear usage. In this regard, the rate of use for each application may be compared with a preset expected use level in order to predictably catch erroneous operations (e.g., excessive number of writes over a given elapsed operation time) by a given application. A remote and/or local user may then be allowed to change the operation of the given application (e.g., reconfiguring the application or otherwise adjusting its write performance) to reduce the number of writes by the given application over a given amount of operation time. In this regard, write operations may be changed in one exemplary embodiment by reducing both the program and erase cycles.

In another exemplary embodiment, the disclosed systems and methods may be implemented to provide configurable policies to which a local and/or remote user may proactively control wear contributing functionality before a critical point is reached that may inhibit base system functionality. In this regard, user-selectable policies may be offered to a remote and/or local user to allow the user to take specific actions to prevent total embedded non-volatile memory wear. For example, upon reaching one or more logged wear level critical threshold(s), a user may be alerted to the wear level and may be offered options for handling select embedded usages. Such options may include, but are not limited to, preventing further application accesses though a one-time required user acknowledgement (e.g., synonymous to a BIOS POST F1/F2 pause with warning messages and the ability to accept the risk of proceeding), providing a user with a vacating or spillover function option to permanently relocate partitions to removable and replaceable (e.g., externally accessible) media such as a vFlash SD card or other suitable removable and replaceable memory device, allowing a user to use an embedded subsystem to enforce limiting of further writes of partitions that are directly attached to the host server by converting from Read/Write to Read Only (e.g., by using an embedded subsystem to selectably or selectively prevent writes, updates, log entries or to totally prevent all access such as when actual wear use level becomes within a defined percentage near to the defined 100% wear limit for the given non-volatile memory memory device), etc. Thus, partition reallocation to replaceable media may be used as a mitigation towards the high threshold of cumulative program and erase (P/E) cycles.

In one respect, disclosed herein is an information handling system, including: at least one non-volatile memory (NVM) device; and at least one out-of-band processing device coupled to the NVM device and programmed to receive and intercept access attempts to the NVM device from one or more applications executing inside or outside the out-of-band processing device, the access attempts including at least one or more of read attempts, write attempts, erase attempts, or a combination thereof. The at least one out-of-band processing device may be programmed to respond to the received access attempts in an out-of-band manner by tracking the number of access attempts as a function of cumulative operation time of the flash device.

In another respect, disclosed herein is a method of operating an information handling system having one or more applications executing thereon, including: providing at least one non-volatile memory (NVM) device coupled to at least one out-of-band processing device with one or more of the applications executing inside or outside the out-of-band processing device; using the at least one out-of-band processing device to receive and intercept access attempts to the NVM device from one or more applications executing inside or outside the processing device, the access attempts including at least one or of read attempts, write attempts, erase attempts, or a combination thereof; and using the at least one out-of-band processing device track the number of access attempts as a function of cumulative operation time of the NVM device.

DESCRIPTION OF ILLUSTRATIVE EMBODIMENTS

Figure 1:
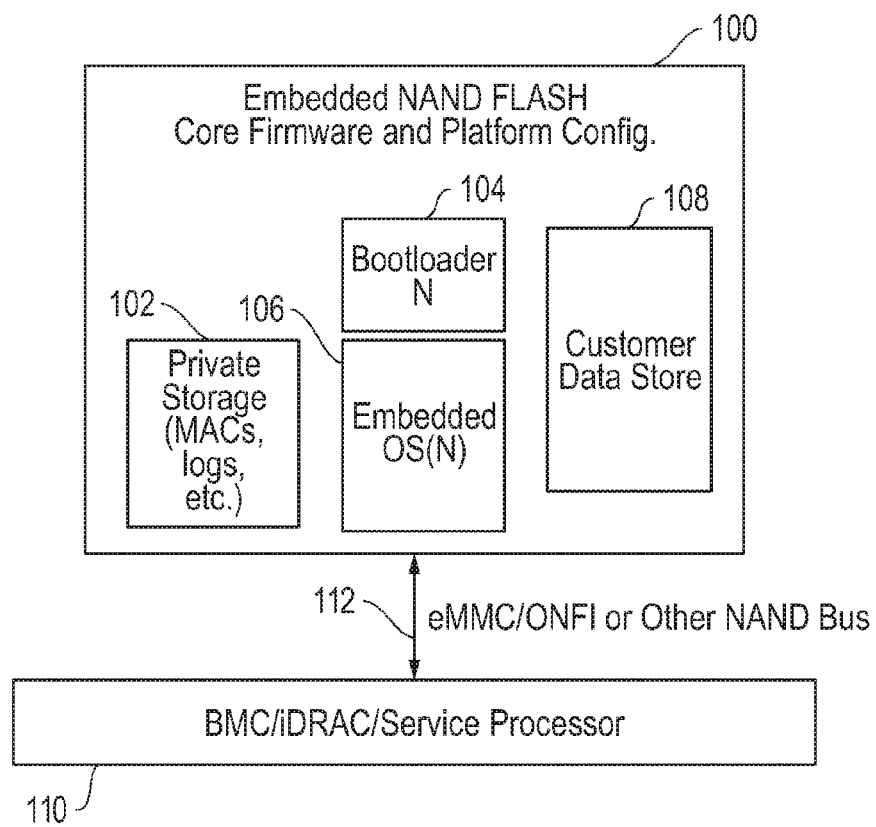
FIG. 1 is a simplified block diagram of a conventional non-volatile memory architecture.
Figure 2:
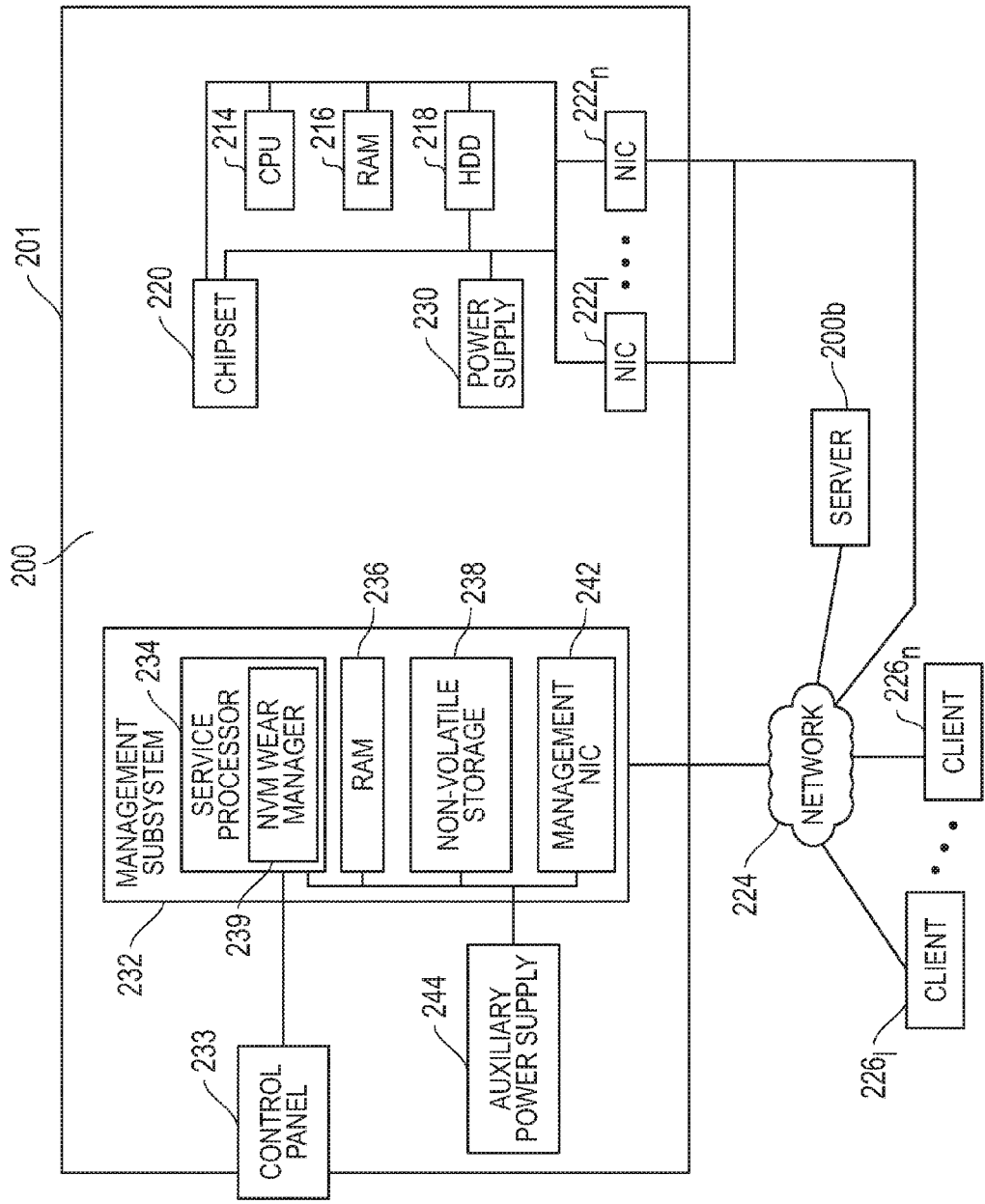
FIG. 2 is a simplified block diagram of information handling system according one exemplary embodiment of the disclosed systems and methods.

FIG. 2 is a block diagram illustrating one exemplary embodiment of an information handling system configured in the form of a server 200 having a plurality of information processing components disposed in a housing 201 including a CPU 214, RAM 216, a hard disk drive (HDD) 218, a chipset 220 and plural network interface cards (NIC) 222. In one embodiment, CPU 214 and other components of server 200 may be configured to perform one or more information processing and/or network routing tasks, e.g., for client information handling systems communicatively coupled to server 200 by network 224. It will be understood that the disclosed systems and methods may be implemented with a variety of other types of information handling systems besides servers, e.g., desktop computers, notebook computers, etc. Specific examples of other types of information handling systems with which the disclosed systems and methods may be implemented include, but are not limited to, data center servers, cloud servers and rack workstations.

As illustrated, in this embodiment server 200 communicates over a network 224 with client information handling systems 226 and other servers 200, such as in a local area network (LAN) configuration. A power supply 230 maintains DC power to the processing components. A management subsystem 232 configured as a remote access card is integrated with server information handling system 200. Management subsystem 232 includes an out-of-band processing device in the form of an embedded service management processor 234 (e.g., such as a BMC microcontroller or any other suitable type of out-of-band processing device), RAM 236, non-volatile storage (NVS) 238 (e.g., Electrically Erasable Programmable Read Only Memory—EEPROM, NOR ROM, NAND FLASH, Hard disk, etc.), and a NIC 242 to interface with network 24. As further indicated, a non-volatile memory (NVM) wear manager 239 may be implemented on service processor 234 to track and predict non-volatile memory wear on NVS 238, and to optionally implement wear alerting and control of writes to NVS 238 based on tracked and/or predicted wear. It will be understood that embedded service management processor 234 is exemplary only, and that other suitable types of processing device that may be implemented to perform the tasks described herein for service management processor 234 include, but are not limited to, remote access controller or other suitable type of out-of-band processing device (e.g., embedded processor, etc.). Such out-of-band processing devices are separate and independent from any in-band host central processing unit (CPU) 214 that runs the host OS of the information handling system 200, and without management of any application executing with a host OS on the host CPU 214.

In the illustrated embodiment, management subsystem 232 may operate on an optional auxiliary power supply 244 to run independently of the rest of information handling system 200. Independent operation of management subsystem 232 allows it to reset, power down and power up information handling system 200. In one exemplary embodiment, management subsystem 232 may manage the operations of information handling system 200 so that a remote user interfaced through network 224 can exercise full control over system operations. In this exemplary embodiment, management subsystem 232 may also be optionally coupled as shown to an optional local control panel 233. Examples of management subsystem features may be found described in United States Patent Application Publication 2006/0265656, and in U.S. patent application Ser. No. 13/097,906, filed Apr. 29, 2011, each of which is incorporated herein by reference in its entirety.

In one embodiment, remote wear reporting, wear control, and display of tracked and predicted non-volatile memory wear characteristics may be accomplished using out-of-band methods such as Web graphical user interface (GUI) and an out-of-band controller such as service processor 234. Examples of such implementations include, but are not limited to, using an integrated Dell Remote Access Controller (iDRAC) available from Dell Products L.P. of Round Rock, Tex. and/or textually via Intelligent Platform Management Interface (IPMI), Dell Remote Access Controller (RA-CADM) or WS Management (WS-MAN). Further information on remote access controllers may be found in United States Patent Application Publication Number 2006/0212143 and United States Patent Application Publication Number 2006/0190532, each of which is incorporated herein by reference in its entirety. However, it will be understood that other configurations of remote access controllers may be suitably employed in other embodiments.

Figure 3:
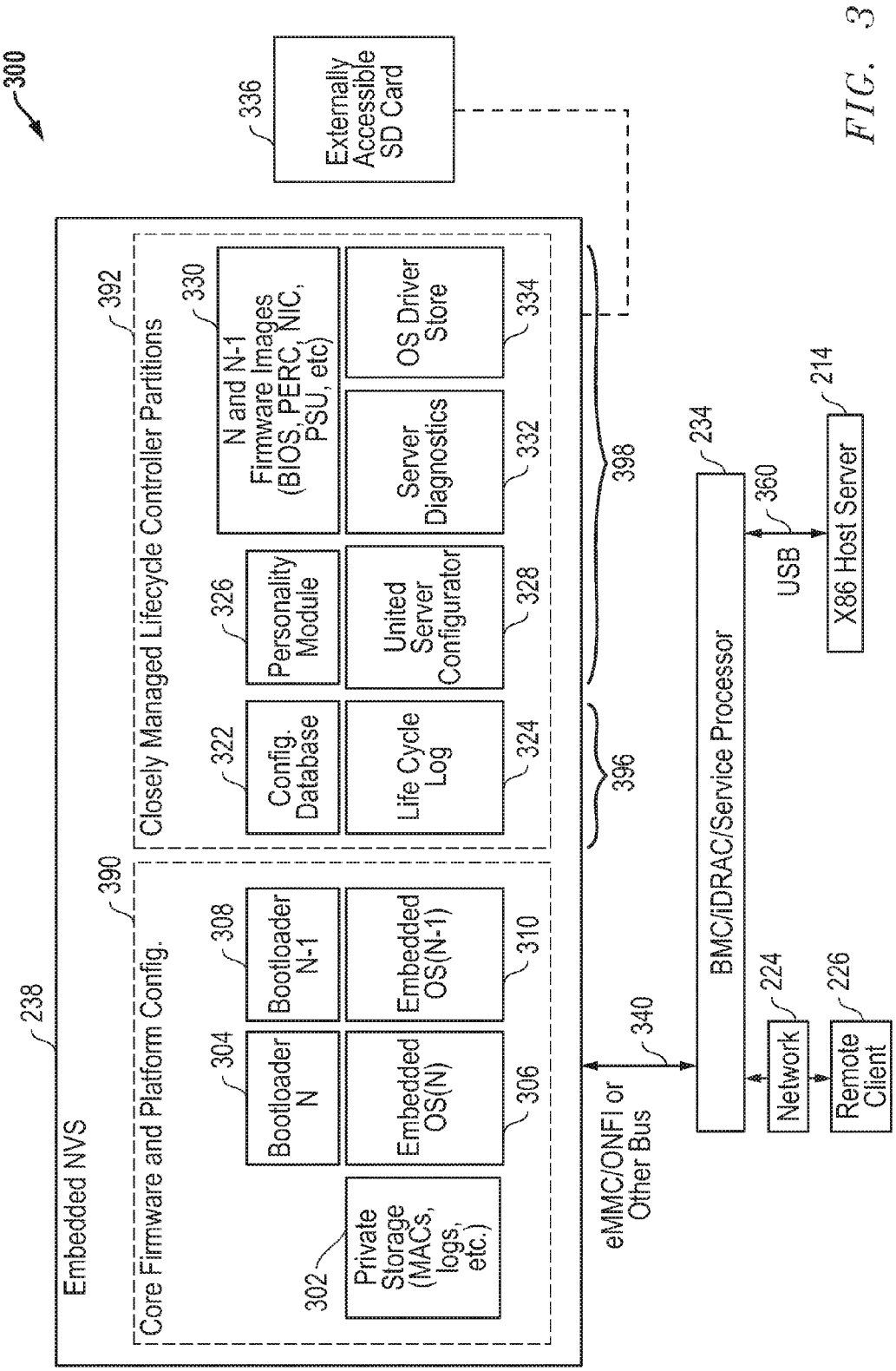
FIG. 3 illustrates a simplified block diagram of a managed non-volatile memory architecture according to one exemplary embodiment of the disclosed systems and methods.

FIG. 3 is a simplified block diagram of a managed non-volatile storage (NVS) architecture 300 as it may be configured according to one exemplary embodiment of the disclosed systems and methods, it being understood that similar architectures may be implemented with a variety of types of non-volatile memory. As shown, NVS architecture 300 includes non-volatile memory in the form of NVM device 238 that is coupled to a processing device 234 (baseboard management controller BMC or service processor) by a NAND bus 340 (e.g., eMMC, Open NAND Flash Interface "ONFI", or any other suitable type of NAND communication bus). Processing device 234 may be further coupled to remote client/s 226 via network 224 as shown. Processing device 234 may also be coupled via chipset 220 and a data bus 360 (e.g., USB or other suitable type of data bus) to CPU 214, e.g., an x86 Host server or other suitable Host processing device of information handling system 102. In one embodiment, functions of processing device 234 (e.g., such as embedded system diagnostics, pre-OS applications such as Unified Server Configurator "USC" providing functionality such as OS installation assistance, BIOS and firmware updates, and various system configuration options) may be emulated through data bus 360 to a host server 214 (e.g., CPU or other suitable host processing device.

FIG. 3 shows storage area of NVM device 238 as it may be configured in one exemplary embodiment with a core firmware and platform storage area 390 that includes those stored components that are written to on a relative infrequent basis. In this regard, core firmware and platform storage area 390 includes stored components accessed by service processor 234 for purposes of core functionality. Specific examples of platform storage area include, but are not limited to, private storage area 302 (e.g., for storing persistent network MAC addresses, logs, system configuration options such as network settings, configuration parameters that are not customer modifiable, etc.), bootloader N 304 and bootloader N-1 308 that perform functions such as BMC hardware configuration, power on self test, booting of the embedded operating system, etc. Respective embedded operating systems OS N 306 and N-1 310 (e.g., embedded Linux, etc.) are present that may be run by service processor 234, e.g., for the purpose of running BMC server management functionality.

Still referring to FIG. 3, NVM device 238 also includes service processor managed partition area 392 that includes both components 396 that are solely owned and modified by service processor 234, and components 398 that are modified through explicit customer update options (e.g., by a local or remote user of information handling system 200). In this exemplary embodiment, components 396 may be solely owned and modified by service management processor 234 and may include configuration database 322 that serves the purpose of storing system configuration options to include hardware, and software and firmware revisions of all components in the system and lifecycle log 324 that may be present for the purpose of storing what changed and when within the system's hardware, BIOS, firmware and software configurations.

Components 398 of this exemplary embodiment may be modifiable through explicit user update actions and may include personality module 326 that is present for the purpose of acting as a data store that houses system branding information such as $3^{rd}$ party logos and special configurations of features for customers that re-sell general purpose servers as their own re-branded products (e.g., OEMs), unified server configurator 328 (e.g., Dell unified server configurator ("USC") server management functionalities available from Dell Products L.P. of Round Rock, Texas) that is present for the purpose of aiding users with OS deployment and overall system image management, N and N-1 firmware images 330 (e.g., BIOS, PowerEdge Expandable RAID Controller "PERC" available from Dell Products L.P. of Round Rock, Tex., network interface card "NIC" firmware, power supply unit "PSU" firmware, etc.) for various components of information handling system 200, service diagnostics 332 that is used for diagnosing health of all or selected subsystems and that may be run through host processor 214 via USB 360 (or other suitable communication bus such as serial bus), and OS driver store 334 for storing device drivers for various components of information handling system 200 (e.g., a copy of the storage, network and video adapter device drivers so that an OS (re)installation may proceed more quickly and in some cases without manual user intervention). It will be understood that the illustrated components 396 and 398 are exemplary only, and that fewer or additional components may be present and modified over time on NVM device 238.

As further shown in FIG. 3, an optional and separate externally accessible (e.g., that is connectable and removable via temporary connectors) storage device 336 such as a SD card may be coupled to NVM device 238 to perform the function of a virtual flash device, i.e., that is a persistent storage area that is remotely writable/readable and emulated to the information handling system 102 (e.g., such as a server) via a data bus 360 (e.g. USB) with total or complete read/write permission. In one exemplary embodiment, externally accessible storage device 336 may be written to through service processing device 234. As will be described further herein, selectable partitions of NVM device 238 may be optionally re-located (e.g., under control of NVM wear manager 239 of service processor 234) to separate storage device 336 upon detection that corresponding selected storage areas of NVM device 238 have reached a pre-defined wear threshold. In this way, those particular types of writes to NVM device 238 that have been determined to exceed expected usage levels (e.g. such as when writes from certain applications are being overused by user and/or system) may be moved or vacated to externally accessible storage device 336. Alternatively or additionally, selectable partitions of separate storage device 336 that have previously been used for user "free use" areas may be optionally re-located (e.g., under control of NVM wear manager 239 of service processor 234) to NVM device 238 upon detection that writes to NVM device 238 are under a predefined wear threshold.

Figure 4:
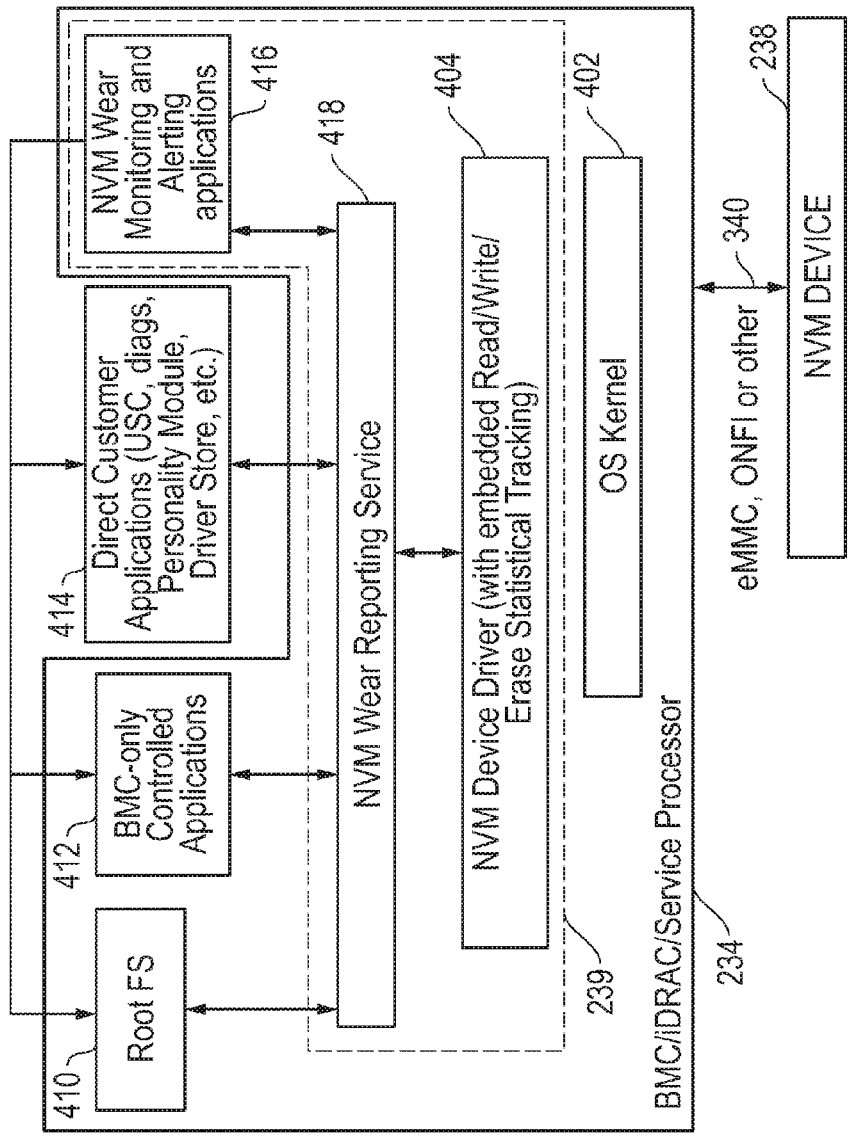
FIG. 4 illustrates a simplified block diagram of a non-volatile memory wear management architecture according to one exemplary embodiment of the disclosed systems and methods.

FIG. 4 illustrates a simplified block diagram of NVM wear management architecture 400 as it may be implemented in one exemplary embodiment. As shown in FIG. 4, NVM wear manager 239 is programmed and executing on out-of-band service processor 234 to perform its tasks outside (and in a device separate from) NVM device 238. In this exemplary embodiment, components of NVM wear manager 239 include NVM driver 404, NVM wear reporting service 418, and NVM wear monitoring and alerting applications 416. As shown, NVM driver 404 intercepts and statistically tracks data writes, data reads and data erase operations directed to NVM device 238 from applications of information handling system 200, e.g., including service processor-only controlled applications 412 (e.g., system thermal management), direct customer (user) applications (e.g., USC, diags, personality module, driver store, etc.) and root file system 410. Thus, in this embodiment, out-of-band service processor 234 is in the path for all operations that result in NVM device accesses, including both applications executing on the service processor 234 and applications that execute on the host server (e.g., CPU 214). NVM driver 404 communicates with NVM device 238 via OS kernel 402 and NAND bus 340. In addition to performing embedded read/write/erase logging, NVM driver 404 may also perform statistical tracking operations such as tracking total and minimum, maximum or average transactions rates.

Still referring to FIG. 4, NVM wear reporting service 418 receives the statistically tracked and logged read/write/erase information from NVM driver 404 and in turn provides the logged/statistically-tracked read/write/erase information from various applications 410, 412 and 414 to NVM wear monitoring and alerting applications 416 of NVM wear manager 239. In this exemplary embodiment, each of applications 402, 410, 412, 416 and 418, execute on the service management processor 234, and direct customer applications 414 may be applications that the service management processor 234 serves up to run externally on the host server CPU(s) 214 by way of emulation of USB mass storage devices.

In operation of architecture 400, each of applications 410, 412 and 414 register with NVM wear reporting service 418 before and after accessing NVM driver 404. NVM wear reporting service 418 receives and logs the statically tracked accesses to and from NVM driver 404 by each of the applications 410, 412 and 414, and NVM driver 404 may in turn take snapshots of statistics for tracking NVM use to each given process or application, e.g., including using counters to count the cumulative number of NVM write accesses as well as the identity of the process or application making each access. NVM wear reporting service 418 may provide this logged access data (e.g., in real time) to NVM wear monitoring and alerting applications 416, which may implement policies that block writes (e.g., using write protection) from any one or more of applications 410, 412 and 414 entirely to, or to specific areas of, NVM device 238 as specified by the given policy, e.g., to reduce overall wear and/or to distribute wear more evenly across the NVM device 238. It will be understood that for purposes of tracking cumulative memory usage and total wear levels, in one embodiment it may be assumed that any operating wear leveling algorithms that are employed act to evenly distribute wear across NVM device 238.

In one embodiment, NVM wear manager 239 may be implemented as embedded firmware executing on service processor 234. One or more NVM wear tracking and management tasks may be performed by NVM wear manager 239. Examples of such NVM wear tracking and management tasks include, but are not limited to, local and/or remote graphical display of statistically tracked (i.e., actual) NVM wear versus expected (i.e., predicted) wear visibility with an optional breakdown of individual wear contributors (e.g., such as applications 410, 412 and 414), generating local or remote alerts when the level of one or more tracked wear activities becomes out of bounds by exceeding expected wear amounts for such activities and before predefined (e.g., theoretical) wear out points or thresholds are reached for a NVM device 238, or a combination thereof. NVM wear manager 239 may also be capable of implementing configurable wear policies, e.g. to allow a user to proactively control wear contributing functionality before a critical wear threshold is reached that may inhibit base system functionality.

One example of such a policy is to block writes according to a pre-determined priority assigned to different types of writes. For example, certain writes to NVM device 238 from given applications or types of applications may be classified as "non-critical" writes that are to be blocked while continuing to allow writes classified as "critical" (e.g., operating system writes that are necessary to boot the system) to NVM device 238 in the event that it is determined that write levels are exceeding a given expected or acceptable wear level threshold that will result in premature memory failure. Additionally or alternatively, writes of different types or from different applications may be assigned an ordered priority relative to other types of writes or writes from other applications, such that the lowest priority write types are blocked before all higher priority write types when it is determined that total number of writes is to be reduced, e.g., due to exceeding a given expected or acceptable wear level threshold that will result in premature memory failure.

Figure 5:
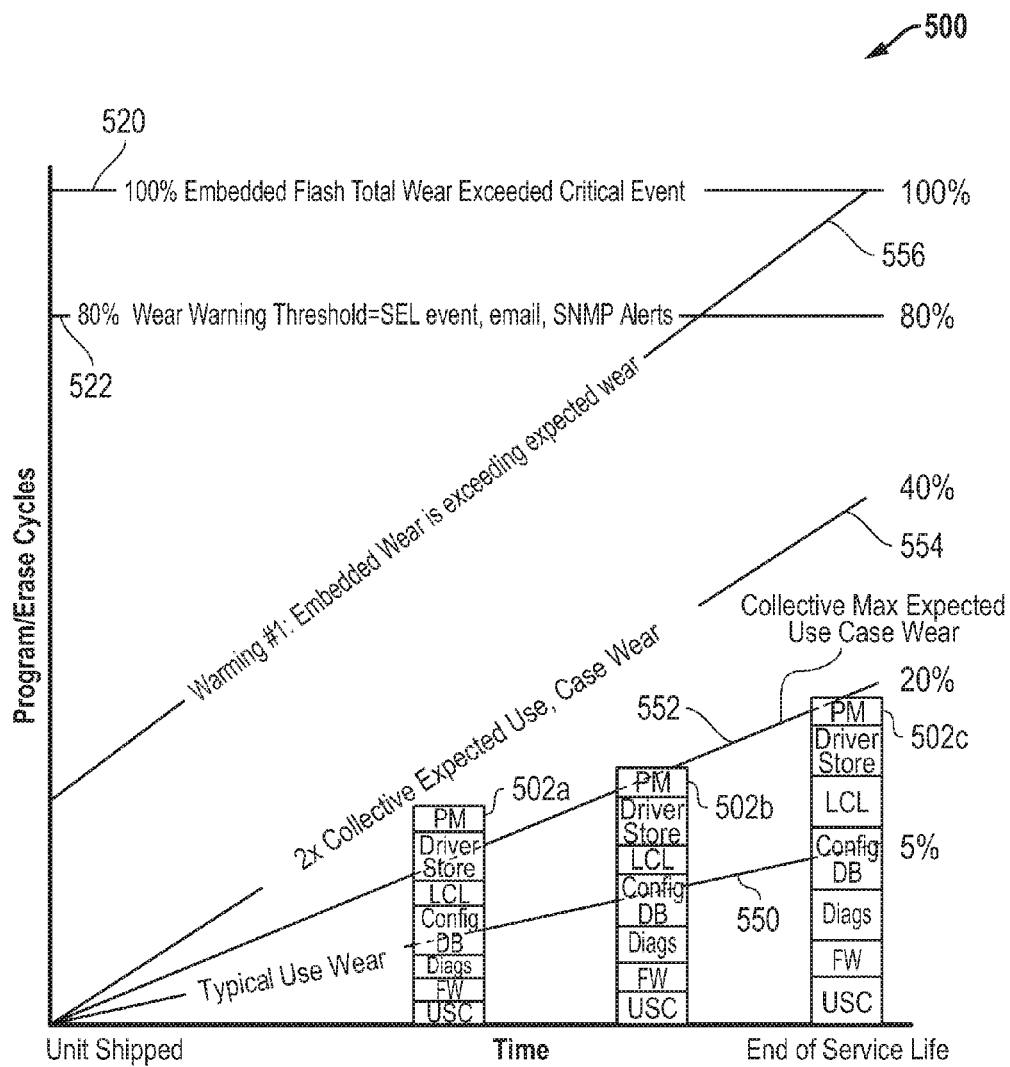
FIG. 5 illustrates a graphical user interface (GUI) according to one exemplary embodiment of the disclosed systems and methods.

FIG. 5 illustrates one exemplary embodiment of graphical user interface (GUI) relationship 500 that may be remotely or locally displayed, e.g., by NVM wear monitoring and alerting applications 416 of FIG. 4. In this regard it will be understood that all or a portion of the information contained in GUI 500 may be displayed locally via local control panel 233 (e.g., LCD display, command line interface, etc.) or remotely via network 224 to remote client user/s 226, etc. In the illustrated exemplary embodiment, FIG. 5 may display wear level for NVM device 238 as a function of NVM device program/erase cycles versus time. It will be understood that the graphical relationship of FIG. 5 may vary in format and number and/or types of items and relationships displayed. Furthermore, it will be understood that one or more elements corresponding to the data of the graphical relationship 500 of FIG. 5 may be internally used by service processor to logically track actual NVM wear versus expected wear and wear alert thresholds, i.e., even without display to a local or remote user. As will be further described, FIG. 5 illustrates one example of how graphical and statistical actual versus expected wear visibility may be provided with a breakdown of individual wear contributors, e.g., individual applications.

Still referring to the exemplary display of FIG. 5, information handling system of use time extends on the X-axis as shown between initial use (e.g., information handling system 200 shipped as new to user) and expected end of service life (e.g., empirically determined or assumed duration of actual useful life of information handling system 200). As shown, total wear level/s generated by writes from individual applications may be represented (and updated) at different cumulative operation times by wear level bars 502a, 502b and 502c in order to give a user an idea of actual per application and total NVM wear versus expected wear at a given service life time. In addition to total wear being indicated by the overall height of each bar 502, each wear level bar 502a, 502b and 502c may be optionally segregated as shown to show the amount of wear attributable to each given application that has generated writes to NVM device 238. This may be used to allow a user to determine how to optimize writing behavior on a per application basis, e.g., by decreasing or increasing the write occurrences versus time for a given application/s relative to other application/s in response to actual measured wear for each given application.

In this embodiment, two pre-defined fixed wear thresholds (80% wear warning threshold 522 and 100% embedded NVM total wear exceeded threshold 520) have been selected, e.g., based on assumed or empirically measured wear characteristics of NVM device 238). For example, laboratory measured wear levels (number of writes) at which a given type of NVM device becomes unreliable or exhibiting memory failure may be employed to determine 100% embedded NVM total wear, and other lesser wear percentage thresholds (e.g., 80% wear or any other desired wear percent) proportionately determined therefrom. 100% embedded NVM total wear value may also be determined based on "worst case" usage information from NVM manufacturer (e.g., assuming ideal wear leveling algorithm and based on factors such as total number of writes per cell, sector size, temperature range, etc.).

Local and/or remote alerting may also be provided when out of bounds wear activities occur before the theoretical wear out points are reached. For example, in one embodiment, particular user alerts and system actions may be triggered when wear thresholds are reached or exceeded. For example, a user alert may be triggered when 80% wear warning threshold 522 of FIG. 5 is exceeded (e.g., a user may be alerted by System Event Log (SEL), email, simple network management protocol (SNMP), message displayed on local control panel 233, etc.). As shown, a critical event may be detected and active upon when the 100% embedded NVM total wear exceeded threshold 520 is met. Examples of critical event actions that may be triggered when the 100% embedded NVM total wear exceeded threshold 520 is met include, but are not limited to, local and/or remote user alerts, disabling system services such as diagnostics or the lifecycle log, etc. It will be understood that the particular number and percentage levels of such pre-defined fixed wear thresholds may be in one embodiment user-definable and/or user-changeable, e.g., by remote user 226 and/or local user via local input device/s (e.g., keyboard, keypad, touchpad, etc.) of local control panel 233 of information handling system 200.

Also shown in FIG. 5 are predefined variable wear thresholds 550, 552 and 554 that may be predefined for a given NVM device 238, e.g., based on assumed and/or empirically-measured wear levels versus time. In the illustrated embodiment, a typical expected use wear variable threshold 550 is defined to represent the typical (or average) expected cumulative NVM device wear level for each application 410, 412 or 414 at any given use time during the expected lifetime of information handling system 200 (e.g., in this case resulting in about 5% total wear level at end of expected useful life of information handling system 200 for Config DB). Such a typical expected use wear threshold 550 may be estimated for each of applications 412 and 414, and file system 410 of FIG. 4, for example, based on assumptions about the use of these applications. In this regard, average data write size for each application (e.g., such as each of applications 410, 412 and 414) may be measured, and the number of data writes generated by a user over time assumed for each application (e.g., a new BIOS update of a given size may be assumed to occur every three months). The average data write size may be multiplied by the assumed cumulative number of data writes for each application at a given time to give a total cumulative data write or typical expected use wear variable threshold 550 for each application at the given time.

A collective maximum use case wear variable threshold 552 is also defined in FIG. 5 to represent a maximum (or worst) expected cumulative NVM device wear level at any given use time during the expected lifetime of information handling system 200 (e.g., in this case resulting in about 20% total wear level at end of expected useful life of information handling system 200). This collective maximum use case wear variable threshold 552 represents the total of all expected use wear variable thresholds 550 for all applications (e.g., such as applications 410, 412 and 414) as shown.

Configurable policies to which a user can proactively control wear contributing functionality may also be implemented before a critical point is reached that may inhibit base system functionality. For example, in one embodiment, a user may visibly compare updated wear level (height) of wear level bars 502a, 502b and 502c to the pre-defined wear variable thresholds to determine how actual wear of one or more applications at a given cumulative operation time compares to the pre-defined variable threshold wear levels (e.g., pre-defined expected case threshold or worse case variable threshold) for the same cumulative operation time. This comparison of actual wear to a wear threshold may be based on a comparison of total wear from all applications versus a total wear threshold, or based on a comparison of an individual application actual versus wear threshold for that given individual application. In any case, the user may then adjust the memory wear characteristics of one or more individual applications as may be appropriate based on this comparison, e.g., to reduce the application write frequency where actual wear exceeds the expected case threshold, to increase the application write frequency where actual wear is below the expected case threshold, or to block all writes from a given application to reduce memory wear where actual wear exceeds the expected case threshold. It will also be understood that wear alerts may be optionally generated on a per-application basis, e.g., when actual wear of a given application at a given cumulative operation time exceeds a threshold wear level (e.g., expected case threshold or worse case variable threshold) for the given application at the same cumulative operation time.

Still referring to FIG. 5, another pre-defined variable wear threshold shown in FIG. 5 is 2× (i.e., double) expected typical use case wear level 554 that may be used and/or displayed as a point of reference to judge the magnitude of current cumulative wear level versus expected cumulative wear after a given amount of operating time (e.g., in this case resulting in about 40% total wear level at end of expected useful life of information handling system 200). Variable wear thresholds 550, 552 and 554 are exemplary only, and may be different in number and/or type, and/or may be user-definable or user-changeable in a similar manner as pre-defined fixed wear thresholds 520 and 522.

Also shown in FIG. 5 is dynamic (non-static) wear alert threshold 556 that represents the tracked wear level at which an alert may be issued to inform a user that embedded wear level is exceeding expected wear. Such a dynamic wear threshold 556 may be, for example, a relative difference between the actual current wear level and some other (e.g., expected) linearly increasing wear level threshold so as to detect when a current actual wear level rate is exceeding an expected wear level rate (i.e., rather than exceeding a fixed absolute threshold value). In one embodiment, when dynamic wear threshold 556 is reached, an alert may be sent to remote and/or local user to give the user/s the opportunity to adjust usage behavior in order to eliminate or reduce memory usage practices that are causing excessive wear. Intersection of dynamic wear threshold 556 with 100% embedded NVM total wear exceeded threshold 520 may also be used to predict end of service life for the NVM device. It will also be understood that any one or more of the types of static, variable, or dynamic thresholds of wear versus time such as illustrated in FIG. 5 need not be linear, but may alternatively be curved, irregular or "bursty", etc.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will be understood that one or more of the tasks, functions, or methodologies described herein (e.g., service processor 234) may be implemented, for example, as firmware or other computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   at least one non-volatile memory (NVM) device that includes an integrated controller and a storage area; and
   at least one in-band processing device coupled to at least one out-of-band processing device, the in-band processing device being programmed to execute an in-band operating system and one or more applications;
   where the at least one out-of-band processing device is coupled to the NVM device and programmed to receive and intercept all access attempts to the NVM device from one or more applications executing inside or outside the out-of-band processing device, the access attempts comprising at least one or more of read attempts, write attempts, erase attempts, or a combination thereof;
   where the at least one out-of-band processing device is separate from and outside of the NVM device and is programmed to respond to the received access attempts in an out-of-band manner by tracking the number of access attempts as a function of cumulative operation time of the NVM device;
   where the out-of-band processing device is a service processor that is configured to operate separate and independent from the in-band processing device, and without management of any of the applications executing with the in-band operating system on the in-band processing device.

2. The information handling system of claim 1, where the out-of-band processing device is programmed to execute an out-of-band operating system and one or more applications; where the at least one out-of-band processing device is programmed to receive and intercept access attempts to the NVM device from the in-band operating system, out-of-band operating system and from the one or more applications executing on the in-band and out-of-band processing devices; where the at least one out-of-band processing device is programmed to track and log the number of received access attempts as function of cumulative operation time of the NVM device from each of the in-band operating system, out-of-band operating system, and each of the one or more applications executing on the in-band and out-of-band processing devices.

3. The information handling system of claim 1, where the out-of-band processing device is programmed to provide access tracking information to a local user of the information handling system, the access tracking information comprising the number of access attempts to the NVM device as a function of cumulative operation time of the NVM device.

4. The information handling system of claim 1, where the out-of-band processing device is programmed to communicate with a remote user over a coupled network; and where the out-of-band processing device is configured to provide access tracking information to the remote user over the network, the access tracking information comprising the number of access attempts to the NVM device as a function of cumulative operation time of the NVM device.

5. The information handling system of claim 1, where the out-of-band processing device is programmed to compare a cumulative tracked number of access attempts for a given cumulative operation time of the NVM device to a dynamic non-static wear level threshold of access attempts at the same given cumulative operation time of the NVM device; and to generate an alert to a user of the information handling system when the cumulative tracked number of access attempts exceeds the dynamic non-static wear level threshold of access attempts at the same given cumulative operation time of the NVM device.

6. The information handling system of claim 1, where the out-of-band processing device is programmed to generate a graphical representation of the tracked number of access attempts for a given cumulative operation time of the NVM device for presentation to a local user using a coupled display device or to a remote user across a coupled network.

7. The information handling system of claim 1, where the out-of-band processing device is programmed to extrapolate the rate of a number of future access attempts to the NVM device as a function of cumulative operation time of the NVM device based at least in part on the historical rate of actual tracked number of access attempts as a function of actual cumulative operation time of the NVM device.

8. The information handling system of claim 1, where the out-of-band processing device is programmed to selectively block one or more of the attempted access attempts to the NVM device based on at least one of current cumulative tracked number of access attempts to the NVM device at the current cumulative operation time of the NVM device, a user command received by the out-of-band processing device from a remote user across a coupled network, a user command received via a local input device by the out-of-band processing device from a local user of the information handling system, a pre-defined priority policy for different types of access attempts, or a combination thereof.

9. An information handling system, comprising:
at least one non-volatile memory (NVM) device that includes an integrated controller and a storage area; and
at least one in-band processing device coupled to at least one out-of-band processing device, the in-band processing device being programmed to execute an in-band operating system and one or more applications;
where the at least one out-of-band processing device is coupled to the NVM device and programmed to receive and intercept all access attempts to the NVM device from one or more applications executing inside or outside the out-of-band processing device, the access attempts comprising at least one or more of read attempts, write attempts, erase attempts, or a combination thereof;
where the out-of-band processing device is configured to operate separate and independent from the in-band processing device, and without management of any of the applications executing with the in-band operating system on the in-band processing device;
where the at least one out-of-band processing device that is separate from and outside of the NVM device and is programmed to respond to the received access attempts in an out-of-band manner by tracking the number of access attempts as a function of cumulative operation time of the NVM device; and
where the NVM device and out-of-band processing device are embedded in a motherboard of the information handling system; where the information handling system further comprises a replaceable and removable storage device that is a separate device from the embedded NVM device and that is coupled to the out-of-band processing device; where the access attempts comprise write attempts; and where the out-of-band processing device is programmed to selectively redirect at least a portion of the write attempts to the separate replaceable and removable storage device based on at least one of current cumulative tracked number of access attempts to the NVM device at the current cumulative operation time of the NVM device, a user command received by the out-of-band processing device from a remote user across a coupled network, a user command received via a local input device by the out-of-band processing device from a local user of the information handling system, a pre-defined priority policy for different types of access attempts, or a combination thereof.

10. An information handling system, comprising:
at least one non-volatile memory (NVM) device that includes an integrated controller and a storage area; and
at least one in-band processing device coupled to at least one out-of-band processing device, the in-band processing device being programmed to execute an in-band operating system and one or more applications;
where the at least one out-of-band processing device is coupled to the NVM device and programmed to receive and intercept all access attempts to the NVM device from one or more applications executing inside or outside the out-of-band processing device, the access attempts comprising at least one or more of read attempts, write attempts, erase attempts, or a combination thereof;
where the out-of-band processing device is configured to operate separate and independent from the in-band processing device, and without management of any of the applications executing with the in-band operating system on the in-band processing device;
where the at least one out-of-band processing device that is separate from and outside of the NVM device and is programmed to respond to the received access attempts in an out-of-band manner by tracking the number of access attempts as a function of cumulative operation time of the NVM device; and
where the NVM device and out-of-band processing device are embedded on a motherboard of the information handling system; where the information handling system further comprises a replaceable and removable storage device that is a separate device from the embedded NVM device and that is coupled to the out-of-band processing device; and where the out-of-band processing device is programmed to selectively relocate data from the embedded NVM device to the separate replaceable and removable storage device in response to a user command received by the out-of-band processing device from a remote user across a coupled network, a user command received via a local input device by the out-of-band processing device from a local user of the information handling system, or a combination thereof.

11. A method of operating an information handling system having one or more applications executing thereon, comprising:
providing at least one in-band processing device coupled to at least one out-of-band processing device;
executing an in-band operating system and one or more applications on the in-band processing device;
providing at least one non-volatile memory (NVM) device that includes an integrated controller and a storage area and that is coupled to the at least one out-of-band processing device, the out-of-band processing device being separate from and outside of the NVM device and being coupled to the in-band processing device, with one or more of the applications executing inside or outside the out-of-band processing device;
using the at least one out-of-band processing device to receive and intercept access attempts to the NVM device from all applications executing inside or outside the processing device, the access attempts comprising at least one or of read attempts, write attempts, erase attempts, or a combination thereof; and
using the at least one out-of-band processing device to track the number of access attempts as a function of cumulative operation time of the NVM device;
where the out-of-band processing device is a remote access controller or a service processor that operates separate and independent from the in-band processing device, and without management of any of the applications executing with the in-band operating system on the in-band processing device.

12. The method of claim 11, further comprising:
executing an out-of-band operating system and one or more applications on the out-of-band processing device;
using the out-of-band processing device to receive and intercept all access attempts to the NVM device from the in-band operating system, out-of-band operating system and from the one or more applications executing on the in-band and out-of-band processing devices; and using the out-of-band processing device to track and log the number of received access attempts as function of cumulative operation time of the NVM device from each of the in-band operating system, out-of-band operating system, and each of the one or more applications executing on the in-band and out-of-band processing devices.

13. The method of claim 11, further comprising using the out-of-band processing device to provide access tracking information to a local user of the information handling system, the access tracking information comprising the number of access attempts to the NVM device as a function of cumulative operation time of the NVM device.

14. The method of claim 11, further comprising:
providing a network coupled to the information handling system; and
using the out-of-band processing device to provide access tracking information to the remote user over the network, the access tracking information comprising the number of access attempts to the NVM device as a function of cumulative operation time of the NVM device.

15. The method of claim 11, further comprising using the out-of-band processor to:
compare a cumulative tracked number of access attempts for a given cumulative operation time of the NVM device to a dynamic non-static wear level threshold of access attempts at the same given cumulative operation time of the NVM device; and
generate an alert to a user of the information handling system when the cumulative tracked number of access attempts exceeds the dynamic non-static wear level threshold of access attempts at the same given cumulative operation time of the NVM device.

16. The method of claim 11, further comprising using the out-of-band processor to:
generate a graphical representation of the tracked number of access attempts for a given cumulative operation time of the NVM device; and
presenting the generated graphical representation to a local user on a coupled display device or to a remote user across a coupled network.

17. The method of claim 11, further comprising using the out-of-band processor to extrapolate the rate of a number of future access attempts to the NVM device as a function of cumulative operation time of the NVM device based at least in part on the historical rate of actual tracked number of access attempts as a function of actual cumulative operation time of the NVM device.

18. The method of claim 11, further comprising using the out-of-band processor to selectively block one or more of the attempted access attempts to the NVM device based on at least one of current cumulative tracked number of access attempts to the NVM device at the current cumulative operation time of the NVM device, a user command received by the out-of-band processing device from a remote user across a coupled network, a user command received via a local input device by the out-of-band processing device from a local user of the information handling system, a pre-defined priority policy for different types of access attempts, or a combination thereof.

19. A method of operating an information handling system having one or more applications executing thereon, comprising:
providing at least one in-band processing device coupled to at least one out-of-band processing device;
executing an in-band operating system and one or more applications on the in-band processing device;
providing at least one non-volatile memory (NVM) device that includes an integrated controller and a storage area coupled to at least one out-of-band processing device that is separate from and outside of the NVM device, with one or more of the applications executing inside or outside the out-of-band processing device;
using the at least one out-of-band processing device to receive and intercept all access attempts to the NVM device from one or more applications executing inside or outside the processing device, the access attempts comprising at least one or of read attempts, write attempts, erase attempts, or a combination thereof; and
using the at least one out-of-band processing device track the number of access attempts as a function of cumulative operation time of the NVM device;
where the out-of-band processing device operates separate and independent from the in-band processing device, and without management of any of the applications executing with the in-band operating system on the in-band processing device;
where the access attempts comprise write attempts; and where the method further comprises:
providing the NVM device and out-of-band processing device as components embedded in a motherboard of the information handling system,
providing a replaceable and removable storage device that is a separate device from the embedded NVM device and that is coupled to the out-of-band processing device, and
using the out-of-band processing device to selectively redirect at least a portion of the write attempts to the separate replaceable and removable storage device based on at least one of current cumulative tracked number of access attempts to the NVM device at the current cumulative operation time of the NVM device, a user command received by the out-of-band processing device from a remote user across a coupled network, a user command received via a local input device by the out-of-band processing device from a local user of the information handling system, a pre-defined priority policy for different types of access attempts, or a combination thereof.

20. A method of operating an information handling system having one or more applications executing thereon, comprising:
providing at least one in-band processing device coupled to at least one out-of-band processing device;
executing an in-band operating system and one or more applications on the in-band processing device;
providing at least one non-volatile memory (NVM) device coupled to at least one out-of-band processing device that is separate from and outside of the NVM device, with one or more of the applications executing inside or outside the out-of-band processing device;
using the at least one out-of-band processing device to receive and intercept all access attempts to the NVM device from one or more applications executing inside or outside the processing device, the access attempts comprising at least one or of read attempts, write attempts, erase attempts, or a combination thereof; and
using the at least one out-of-band processing device to track the number of access attempts as a function of cumulative operation time of the NVM device;
where the out-of-band processing device operates separate and independent from the in-band processing device, and without management of any of the applications executing with the in-band operating system on the in-band processing device;
where the method further comprises:
providing the NVM device and out-of-band processing device as components embedded in a motherboard of the information handling system,
providing a replaceable and removable storage device that is a separate device from the embedded NVM device and that is coupled to the out-of-band processing device, and
using the out-of-band processing device to selectively relocate data from the embedded NVM device to the separate replaceable and removable storage device in response to a user command received by the out-of-band processing device from a remote user across a coupled network, a user command received via a local input device by the out-of-band processing device from a local user of the information handling system, or a combination thereof.

21. The method of claim 11, where the access attempts comprise write attempts; and where the method further comprises using the out-of-band processor to selectively block one or more of the attempted write attempts to the NVM device according to a pre-determined priority assigned to different types of writes.

22. The method of claim 21, further comprising assigning a higher priority to write attempts from a first application executing on at least one of the in-band or out-of-band processing devices and a lower priority to write attempts from a second and different application executing on at least one of the in-band or out-of-band processing devices; and using the out-of-band processor to selectively block one or more of the attempted lower priority write attempts to the NVM device from the first application while allowing write attempts to the NVM device from the second application when it is determined by the out-of-band processor that the total number of writes to the NVM device are to be reduced and because the write attempts from the first application are higher priority than the write attempts from the second and different application.

23. The method of claim 11, further comprising using the at least one out-of-band processing device to:
track the number of access attempts as a function of cumulative operation time of the NVM device for each of multiple individual applications executing on at least one of the in-band or out-of-band processing devices;
comparing a cumulative tracked number of access attempts for a given cumulative operation time of the NVM device by each individual one of the multiple applications to a different and individual per-application sub-threshold of access attempts defined separately for each corresponding individual one of the multiple applications at the same given cumulative operation time of the NVM device; and
generating an alert to a user of the information handling system when the cumulative tracked number of access attempts by a given individual application exceeds the particular sub-threshold of access attempts defined for the corresponding individual application at the same given cumulative operation time of the NVM device.

24. The method of claim 23, further comprising then using the using the at least one out-of-band processing device to allow the user of the information handling system to respond to the generated alert by changing the operation of the given individual application to reduce the number of access attempts by the given individual application over a given amount of operation time.

25. The method of claim 18, further comprising using the out-of-band processor to use write protection to selectively and entirely block one or more of the attempted access attempts to the NVM device based on at least one of current cumulative tracked number of access attempts to the NVM device at the current cumulative operation time of the NVM device, a user command received by the out-of-band processing device from a remote user across a coupled network, a user command received via a local input device by the out-of-band processing device from a local user of the information handling system, a pre-defined priority policy for different types of access attempts, or a combination thereof.

26. The method of claim 11, where the out-of-band processing device is a service processor that is separate from the NVM device.

27. The information handling system of claim 1, where the NVM device is an embedded multimedia card (eMMC) embedded storage package that includes a controller.

28. The method of claim 11, where the out-of-band processing device is a remote access controller.

29. The information handling system of claim 1, where the out-of-band processing device is a baseboard management controller (BMC).

30. The information handling system of claim 1, where the NVM device is itself a managed non-volatile memory system.

31. The information handling system of claim 1, where the at least one out-of-band processing device is programmed to receive and intercept access attempts to the NVM device from the in-band operating system and from the one or more applications executing on the in-band processing device.

32. An information handling system, comprising:
at least one non-volatile memory (NVM) device that includes an integrated controller and a storage area; and
at least one in-band processing device coupled to at least one out-of-band processing device, the in-band processing device being programmed to execute an in-band operating system and one or more applications;
where at least one out-of-band processing device is coupled to the NVM device and programmed to receive and intercept all access attempts to the NVM device from one or more applications executing inside or outside the out-of-band processing device, the access attempts comprising at least one or more of read attempts, write attempts, erase attempts, or a combination thereof;
where the at least one out-of-band processing device is separate from and outside of the NVM device and is programmed to respond to the received access attempts in an out-of-band manner by tracking the number of access attempts as a function of cumulative operation time of the NVM device;
where the out-of-band processing device is a remote access controller that is configured to operate separate and independent from the in-band processing device, and without management of any of the applications executing with the in-band operating system on the in-band processing device.

* * * * *